United States Patent

Zechnall et al.

[11] Patent Number: 6,101,872
[45] Date of Patent: Aug. 15, 2000

[54] SENSOR HAVING A THIN FILM ELEMENT

[75] Inventors: Martin Zechnall, Schwieberdingen; Christoph Treutler, Wannweil; Manfred Lembke, Gerlingen; Hans Hecht, Korntal-Muenchingen; Jiri Marek, Reutlingen; Herbert Goebel, Reutlingen; Martin Willmann, Reutlingen; Hans-Ulrich Gruber, Gerlingen; Andreas Lock; Klaus Heyers, both of Reutlingen; Joerg Buth, Leonberg-Warmbronn, all of Germany

[73] Assignee: Robert Bosch GmbH, Stuttgart, Germany

[21] Appl. No.: 09/036,732

[22] Filed: Mar. 9, 1998

[30] Foreign Application Priority Data

Mar. 14, 1997 [DE] Germany .................. 197 10 559

[51] Int. Cl.[7] ........................................ G01F 1/68
[52] U.S. Cl. ........................................ 73/204.26
[58] Field of Search .................. 73/204.26, 204.23, 73/204.11, 204.19, 204.18

[56] References Cited

U.S. PATENT DOCUMENTS

| | | | |
|---|---|---|---|
| 4,428,817 | 1/1984 | Isenberg | 204/412 |
| 4,455,214 | 6/1984 | Isenberg | 204/428 |
| 4,648,271 | 3/1987 | Woolf | 73/204.27 |
| 4,744,246 | 5/1988 | Busta | 73/204.26 |
| 4,765,880 | 8/1988 | Hayakawa et al. | 204/425 |
| 5,003,822 | 4/1991 | Joshi | 73/204.23 |
| 5,033,299 | 7/1991 | Tanaka et al. | 73/204.26 |
| 5,064,693 | 11/1991 | Hayakawa et al. | 427/372.2 |
| 5,108,193 | 4/1992 | Furubayashi | 73/204.26 |

FOREIGN PATENT DOCUMENTS 0 375 399   6/1990   European Pat. Off. .

Primary Examiner—Harshad Patel
Attorney, Agent, or Firm—Kenyon & Kenyon

[57] ABSTRACT

A sensor has a thin film element, the thin film element having a temperature-dependent electrical resistance. The thin film element includes a platinum layer, which is doped with zircon or zircon oxide. The thin film element can be arranged on a membrane to create a mass airflow sensor.

13 Claims, 1 Drawing Sheet

SENSOR HAVING A THIN FILM ELEMENT

BACKGROUND INFORMATION

European Patent No. 375 399 describes a sensor having a thin film element. The thin film element is comprised of a pure platinum layer, which is fixed to a dielectric layer of silicon nitride by means of adhesion layers of metal oxides. The silicon nitride layer spans, bridge-like, a recess in a silicon substrate. This device is used as a mass airflow sensor, the bridge being heated, and the cooling, from the air flowing past, being measured. The temperature of the bridge element is measured through the temperature dependence of the platinum layer's resistance.

SUMMARY OF THE INVENTION

A sensor of the present invention has an advantage in that the longevity of the temperature dependence of the thin film element is improved. Pure platinum layers can manifest an ageing behavior that alters the temperature dependence of the electrical resistance. By using platinum layers having a small zircon or zircon oxide content, the temperature dependence of the electrical resistance is stabilized.

It is expedient if the zircon or zircon oxide content is on the order of magnitude of 0.1 to 1%. By using a frame of single-crystalline silicon and a dielectric membrane layer, a particularly stable mass airflow sensor can be created. In this context, the membrane can be heated by a heating element, through which means a mass airflow sensor is created. For measuring the temperature of the membrane, either the electrical resistance of the heating element itself or a separate temperature measuring element may be used. To adjust in a controlled manner the voltages in the membrane, it is formed as a multi-layer membrane, comprising a silicon oxide layer and a silicon nitride layer. To improve the adhesion, in this context, the silicon nitride layer can again be transformed, on the surface, into an oxide layer by means of a reoxidation process. The thin film element can be protected from environmental influences through the use of further coating layers.

DETAILED DESCRIPTION

Figure 1:
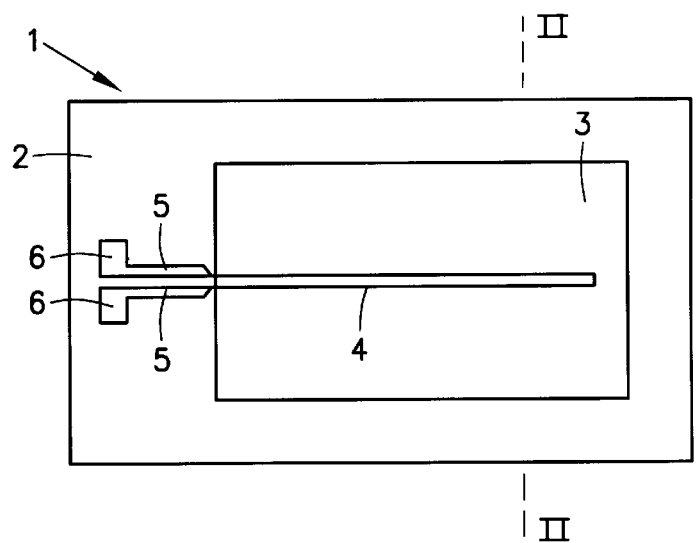
FIG. 1 shows a top view of a first embodiments of a sensor according to the present invention.

In FIG. 1, a top view of a sensor element is shown. The sensor element has a frame 2 of single-crystalline silicon, in which a membrane 3 is fixed. A thin film element 4, which is electrically connected to interconnecting regions 6 by means of printed circuit traces 5, is formed on membrane 3.

Figure 3:
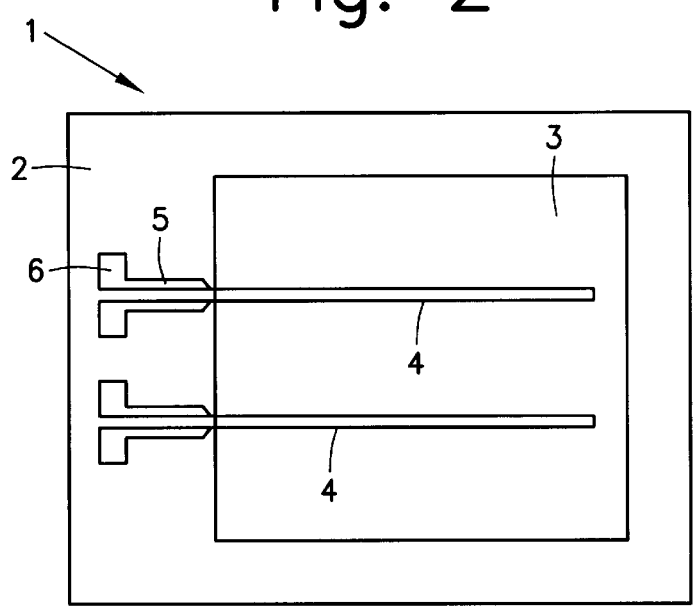
FIG. 3 shows a top view of a second embodiment of the sensor according to the present invention.

Thin film element 4 is a thin metal layer which is patterned so as to form a resistance loop on membrane area 3. By means of two printed circuit traces 5, one end of this resistance loop is connected with one interconnecting region 6, respectively. Wires can be attached to interconnecting regions 6 to provide sensor 1 with an external contact. In this way it is possible to send a current through thin film element 4, formed as a resistance loop, and to measure the resulting voltage drop. This concept can be used in many different ways. By means of a large current flow, the thin film element can be used as a heater, and membrane 3 can thus be heated to above the ambient temperature. Furthermore, it is possible to send only a small current flow through thin film element 4, so that no marked warming of membrane 3 is caused, and to observe the voltage drop occurring in this context in thin film element 4. If thin film element 4 is made of a material whose electrical resistance is temperature dependent, then in this way the temperature on membrane 3 can be measured. It is also possible to use thin film element 4 for heating membrane 3, and at the same time, by measuring the electrical resistance of thin film element 4, to measure the temperature on membrane 3. Thin film element 4 or a plurality of thin film elements 4 (FIG. 3) on membrane 3 can be used particularly advantageously as mass airflow sensor (s). For this purpose, membrane 3 is warmed and the cooling of the membrane, which is caused by the air flowing past, is measured. As described in European Patent No. 375 399, this can occur because a thin film element 4 acts as a heater, and additional thin film elements 4 function as temperature sensors. Alternatively, as shown in FIG. 1, it is of course also possible to provide for only one single thin film element 4, which simultaneously heats membrane 3 and measures the cooling of membrane 3 as a function of the air flowing past. The device according to FIG. 1 can, therefore, be used as a mass airflow sensor.

In this context, it is useful that the electrical resistance and the temperature dependence of the electrical resistance of thin film element 4 be precisely known. Furthermore, the resistance and its temperature dependence should, in this context, remain stable over a long period of time. For forming such thin film elements, platinum has proven to be particularly successful, since these layers can be manufactured with the electrical resistance exhibiting excellent reproducibility in terms of its temperature dependence. To stabilize this temperature dependence over time, after the thin film elements of platinum are manufactured, a temperature treatment with temperatures of more than 500° is carried out. However, it has been demonstrated that, with pure platinum layers, in spite of that sort of temperature treatment, a certain drift, i.e., a change in the resistance and its temperature dependence over time, still occurs. Depending on the duration and operating mode of the sensor (operating temperature, chemical environment), this drift can amount to several thousandths. It has now become clear that by using platinum which is doped with a small quantity of zircon or zircon oxide, this drift can be reduced still more. The temperature dependence of the electrical resistance can be further stabilized so as to improve the measuring accuracy of a sensor that is based thereon. In this context, it has proven to be successful to dope the platinum layer with between 0.01% to 10%, preferably 0.1 to 1% (% by weight) of zircon and zircon oxide. Research has shown that, over the course of time, pure platinum layers change their particle size. This effect was able to be reduced by adding zircon or zircon oxide.

Figure 2:
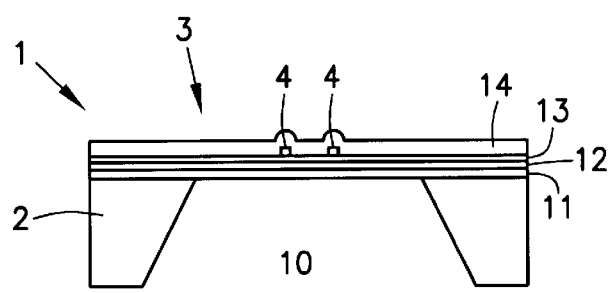
FIG. 2 shows a cross section of the first embodiment of the sensor according to the present invention.

FIG. 2 shows a cross section, along line II—II of FIG. 1; however, FIG. 2 is not to scale with FIG. 1. The manufacturing of this sensor will be explained on the basis of this cross section. To form membrane 3, which is fixed in a frame of single-crystalline silicon 2, a platelike silicon substrate is used as a starting point. Then, for membrane 3, dielectric layers 11, 12, 13 are deposited for membrane 3 on the surface of this platelike silicon substrate. Frame 2 is then formed by etching in a recess 10, starting from the side facing away from dielectric layers 11, 12, 13. Recess 10, in the process, extends up to the lowest dielectric layer 11. For dielectric layers 11, 12, 13, materials are preferred which can be processed quite easily together with silicon. The suggestion is made here, as an exemplary case, to provide a thermal silicon oxide layer in the order of magnitude of about one half micrometer for lower layer 11. A silicon nitride layer 12 is then deposited thereon. In this context, it is advantageous is that silicon oxide layer 11, in comparison to the silicon substrate, exhibits compressive stresses, while silicon nitride layer 12 exhibits tensile stresses.

Therefore, by properly selecting deposition conditions and the thicknesses of layers 11 and 12, and by giving consideration to the subsequent layers, it is possible for membrane 3 to be essentially free of stress, or to have minor tensile stress. In this way, a membrane 3 is created that is particularly robust.

Typically, a silicon nitride layer on the order of magnitude of 0.4 micrometers is deposited. Since the adhesion of metal layers to silicon nitride is poor, in a further process step involving applying oxygen to the nitride layer at a high temperature, a thin superficial layer of the silicon nitride layer 12 (on the order of magnitude of some 10 nm) is transformed to silicon oxide. This reoxidized silicon oxide then functions as an adhesion layer for the successively deposited metal layers.

In a subsequent step, a thin layer of platinum is then doped with small quantities of zircon or zircon oxide. One way this is accomplished is by sputter-depositing a metal layer, proceeding from a correspondingly doped platinum layer. In the event that the adhesion on the reoxidized silicon oxide 13 is not sufficient, then very thin adhesion layers (on the order of magnitude of some nm) may be deposited in advance. Metal oxides or metal silicides are the suggested materials for this purpose. In this context, metals whose nitride or oxide is particularly resistant to high temperatures are preferred, such as tantalum, tungsten, molybdenum, cobalt, etc. The thickness of the platinum layer doped with zircon or zircon oxide amounts to some hundred nanometers. In a further step, this platinum layer is then patterned, in order to delineate out, from the platinum layer, thin film element 4 constituted as a resistance loop.

In FIG. 2, a cross section of thin film element 4 is shown. The thin film element extends onto frame 2. From the doped platinum layer, printed circuit traces 5 and interconnecting areas 6 may be delineated out, the resistance of printed circuit traces 5 through a broader cross section being significantly smaller than the resistance of thin film element 4. To the extent a further decrease in the electrical resistance of printed circuit traces 5 should be necessary, or if other metal layers are required for interconnecting areas 6, the latter may be used additionally or as replacement for the doped platinum layer. On the upper side of membrane 3, then, one additional protective layer 14 is deposited, which, for example, may be of silicon oxide. This protective layer acts to protect thin film element 4 from chemical influences. Such chemical influences can, for example, affect the temperature sensitivity of the electrical resistance of thin film element 4, by permitting impurities to diffuse into the platinum.

What is claimed is:

1. A sensor comprising:
   a thin film element having a temperature-dependent electrical resistance, the thin film element including a platinum layer, the platinum layer being doped with one of zircon and zicron oxide, the thin film element being substantially isolated from external chemical influences.

2. The sensor according to claim 1, wherein the doping is between 0.01% and 10%.

3. The sensor according to claim 1, further comprising:
   a silicon frame; and
   a dielectric membrane, a portion of the film element being arranged on the dielectric membrane, a portion of the dielectric membrane being arranged on the silicon frame.

4. The sensor according to claim 3, wherein the thin film element includes a heating element.

5. The sensor according to claim 4, wherein a temperature of the dielectric membrane is measured by measuring an electrical resistance of at least one of the heating element and at least one further thin film element.

6. The sensor according to claim 3, wherein the dielectric membrane includes a first silicon oxide layer and a silicon nitride layer arranged on the first silicon oxide layer.

7. The sensor according to claim 6, wherein a surface of the silicon nitride layer is transformed by an oxidation process into a second silicon oxide layer.

8. The sensor according to claim 1, further comprising:
   a coating layer, the coating layer protecting the thin film element.

9. A sensor, comprising:
   a thin film element having a temperature-dependant electrical resistance, the thin film element including a platinum layer, the platinum layer being doped with one of zircon and zircon oxide;
   a silicon frame; and
   a dielectric membrane, a portion of the thin film element being arranged on the dielectric membrane, a portion of the dielectric membrane being arranged on the silicon frame,
   wherein the thin film element includes a heating element, and
   wherein a temperature of the dielectric membrane is measured by measuring an electrical resistance of at least one of the heating element and at least one further thin film element.

10. The sensor according to claim 5, wherein the dielectric membrane includes a first silicon oxide layer and a silicon nitride layer arranged on the first silicon oxide layer.

11. The sensor according to claim 6, wherein a surface of the silicon nitride layer is transformed by an oxidation process into a second silicon oxide layer.

12. The sensor according to claim 5, further comprising:
    a coating layer, the coating layer protecting the thin film element.

13. The sensor according to claim 9, wherein the doping is between 0.01% and 10%.

* * * * *